(12) United States Patent
Munroe

(10) Patent No.: US 11,381,167 B2
(45) Date of Patent: *Jul. 5, 2022

(54) POWER CONVERTER WITH SLOPE COMPENSATION

(71) Applicant: Texas Instruments Incorporated, Dallas, TX (US)

(72) Inventor: Michael James Munroe, Londonderry, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,239

(22) Filed: Jan. 27, 2020

(65) Prior Publication Data

US 2020/0161975 A1 May 21, 2020

Related U.S. Application Data

(63) Continuation of application No. 16/183,375, filed on Nov. 7, 2018, now Pat. No. 10,581,325.

(51) Int. Cl.
*H02M 3/158* (2006.01)
*H02M 1/08* (2006.01)
*H02M 3/157* (2006.01)
*H02M 1/00* (2006.01)

(52) U.S. Cl.
CPC ............ *H02M 3/158* (2013.01); *H02M 1/08* (2013.01); *H02M 3/157* (2013.01); *H02M 1/0009* (2021.05)

(58) Field of Classification Search
CPC ........ H02M 3/158; H02M 3/157; H02M 1/08; H02M 1/0009
See application file for complete search history.

(56) References Cited

U.S. PATENT DOCUMENTS

| 5,903,452 | A | 5/1999 | Yang |
| 10,581,325 | B1* | 3/2020 | Munroe ............... H02M 3/158 |
| 2008/0084198 | A1 | 4/2008 | Baurle et al. |
| 2014/0226368 | A1 | 8/2014 | Kimura et al. |
| 2017/0346397 | A1* | 11/2017 | Babazadeh ........... H02M 3/157 |
| 2017/0358990 | A1 | 12/2017 | Papica |
| 2018/0019657 | A1 | 1/2018 | Nakagomi |
| 2018/0278160 | A1 | 9/2018 | Munroe et al. |

* cited by examiner

*Primary Examiner* — Kyle J Moody
(74) *Attorney, Agent, or Firm* — Mark A. Valetti; Charles A. Brill; Frank D. Cimino

(57) ABSTRACT

A converter circuit includes a power stage circuit configured to convert an input voltage received by an inductor to an output voltage provided at an output; a control circuit configured to generate input pulses to control the power stage circuit; a slope compensation circuit configured to provide a compensation signal to the control circuit for overcoming a sub-harmonic oscillation in the converter circuit, wherein the control circuit is configured to generate the input pulses based at least in part on the compensation signal; a slope compensation adjustment circuit configured to determine a rate of change of a current at the inductor and to provide a slope compensation adjustment signal based on the determined rate of change; and a modulation circuit configured to modulate the compensation signal with the slope compensation adjustment signal to produce the adjusted slope compensation signal.

19 Claims, 6 Drawing Sheets

POWER CONVERTER WITH SLOPE COMPENSATION

CROSS REFERENCE TO RELATED APPLICATIONS

Under 35 U.S.C. § 120, this continuation application claims benefits of and priority to U.S. patent application Ser. No. 16/183,375 (TI-79384), filed on Nov. 7, 2018, the entirety of which are hereby incorporated herein by reference.

TECHNICAL FIELD

This disclosure relates to integrated circuits and, more particularly, to a power converter with slope compensation.

BACKGROUND

Switched-mode direct current to direct current (DC-DC) converters represent a primary category for power supply design. For example, a switched-mode DC-DC converter may exceed ninety percent power conversion efficiency and thus has been widely used to supply power in all types of electronic devices, such as computers, cell phones, televisions, and so forth. A recognized instability in the DC-DC converter referred to as sub-harmonic oscillation may occur, and is commonly rectified using a technique known as slope compensation. Existing approaches to implement slope compensation may limit their applications or, in some cases, may result in creating their own instability.

SUMMARY

In one example, a converter circuit includes a power stage circuit configured to convert an input voltage received by an inductor to an output voltage provided at an output; a control circuit configured to generate input pulses to control the power stage circuit; a slope compensation circuit configured to provide a compensation signal to the control circuit for overcoming a sub-harmonic oscillation in the converter circuit, wherein the control circuit is configured to generate the input pulses based at least in part on the compensation signal; a slope compensation adjustment circuit configured to determine a rate of change of a current at the inductor and to provide a slope compensation adjustment signal based on the determined rate of change; and a modulation circuit configured to modulate the compensation signal with the slope compensation adjustment signal to produce the adjusted slope compensation signal.

In another example, a converter circuit includes a power stage circuit coupled between an input and an output of the converter circuit, the power stage circuit including a control input; a driver circuit coupled to the control input; a feedback circuit comprising: an error amplifier coupled to a feedback voltage and a reference voltage; a current comparator coupled to the driver circuit including a first input coupled to an output of the error amplifier and a second input coupled to an output at an inductor; and a slope compensation with slope adjustment circuit coupled to the output of the error amplifier and to the first input of the current comparator.

In yet another example, an integrated circuit device includes a control circuit configured to generate a control signal to control a power converter circuit; a slope compensation circuit configured to provide a compensation signal to the control circuit, wherein the control circuit is configured to generate the control signal based at least in part on the compensation signal; and a slope compensation adjustment circuit configured to dynamically adjust the compensation signal based on a value of an inductor selected to be coupled to the power converter circuit.

DETAILED DESCRIPTION

Figure 1:
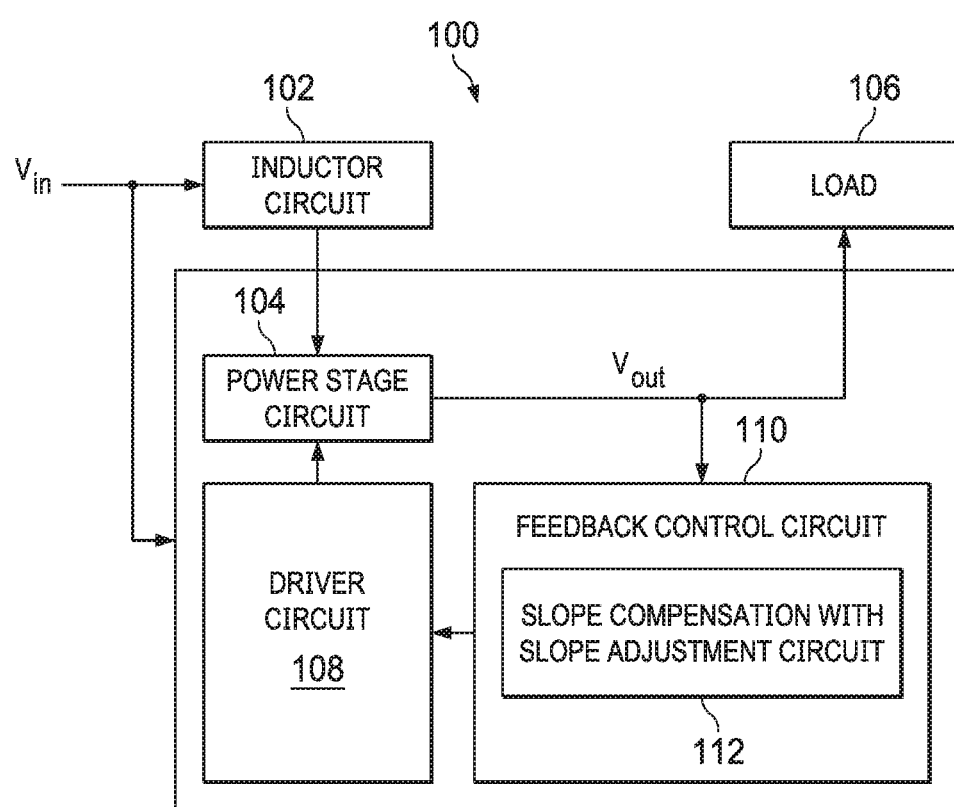
FIG. 1 illustrates an example block diagram of a power converter circuit with adaptive slope compensation.

This disclosure relates to a power converter with adaptive slope compensation. As described herein, an adaptive slope compensation power converter circuit is configured to account for a selected inductor of the power converter and to adjust (e.g., modulate) slope compensation accordingly.

Slope compensation is commonly used to overcome sub-harmonic oscillation in switching power converters. Sub-harmonic oscillation occurs when inductor ripple current does not return to its initial value by the start of a next switching cycle. For peak current mode control, sub-harmonic oscillation occurs with a duty cycle greater than 50%. By adding a compensating ramp equal to the down-slope of the inductor current, any tendency toward sub-harmonic oscillation is damped within one switching cycle. For valley-current mode, sub-harmonic oscillation occurs with a duty cycle less than 50%. In this case, adding a compensating ramp equal to the upslope of the inductor current dampens any tendency towards sub-harmonic oscillation. For emulated peak current mode, the valley current is sampled on the down-slope of the inductor current. In this case, a ramp equal to the sum of both the upslope and down-slope is required. Generally, for any mode of operation, an optimal slope of the compensation ramp for causing a tendency towards sub-harmonic oscillation to damp in one switching cycle is equal to the sum of the absolute values of the inductor upslope and down-slope scaled by the current-sense signal.

Thus, because the effectiveness of slope compensation depends on how closely the compensation matches an inductor current ripple, a particular power converter with slope compensation may be limited in the types of applications that it can support. This is because slope compensation is commonly based on an input voltage and an output voltage of the power converter and does not take into account a selection of an inductor for a specific application. Therefore, depending on a selection of an inductor, the slope compensation may not match well and therefore may not overcome the instability or cause further instability. This may result in diminished performance for a power converter circuit with a selected inductor outside of a particular application that the slope compensation of the power converter circuit was designed for. This poses a challenge for a power converter circuit with slope compensation that was designed for a particular application to be used in alternative applications without undergoing significant redesign of internal components.

A power converter circuit with adaptive slope compensation, as described herein, takes into account the selected inductor for the specific application, and specifically determines a rate of change of current measured at the inductor and adjusts the slope compensation accordingly such that it remains proportional to the selected inductor. Thus, the power converter circuit with adaptive slope compensation is able to effectively overcome instabilities associated with sub-harmonic oscillation regardless of the inductor selected without requiring redesign of internal components. Although the examples described herein may refer specifically to adjusting a slope compensation signal based on a rate of change of a current at an inductor, a slope compensation signal may also be adjusted based on a rate of change of a voltage at an inductor. As a result, the circuitry disclosed herein enables a power converter to operate at higher bandwidth compared to power converters implementing an existing slope compensation. Additionally, or alternatively, the circuits disclosed herein can further reduce instabilities that may otherwise arise using existing slope compensation techniques, especially at higher bandwidth.

FIG. 1 illustrates an example schematic block diagram of a power converter circuit with adaptive slope compensation (hereinafter "converter circuit") 100. As used herein, for example, the term circuit can include a collection of active and/or passive elements that perform a circuit function such as an analog circuit or control circuit. Additionally, or alternatively, the term circuit can include an integrated circuit (IC) where all or some of the circuit elements are fabricated on a common substrate, such as a semiconductor device (e.g., IC chip). In the following examples, the converter circuit may be referred to as a DC-DC buck converter; however, in other examples it may be implemented in other converter topologies.

The converter circuit 100 includes an inductor circuit 102, including inductor L, configured to receive an input voltage and conduct electrical current to a power stage circuit 104. In one example, the inductor circuit 102 is external to the converter circuit 100. In other examples, the inductor circuit 102 can be internal and integrated with the converter circuit 100. The inductor circuit 102 may include one or more inductors selected according to a desired application. A power stage circuit 104 is configured to convert the input voltage (e.g., a DC voltage) $V_{in}$ to provide an output voltage (e.g., another DC voltage) $V_{out}$ to an output to which a load 106 can be connected. For example, the output voltage $V_{out}$ may be less than or greater than the input voltage according to the type of converter. A driver circuit 108 is configured to drive the power stage circuit 104 in response to a control signal (e.g., a pulse width modulated ("PWM") signal or a pulse frequency modulated ("PFM") signal).

A feedback control circuit 110 is configured to generate the input pulses to control the driver circuit 108 based on the output for driving the load 106. For example, the feedback control circuit 110 compares a feedback voltage corresponding to the current supplied to the output with a reference voltage to produce an output signal.

The feedback control circuit 110 includes a slope compensation with slope adjustment circuit 112. The slope compensation with slope adjustment circuit 112 is configured to provide a compensation signal that used to reduce sub-harmonic oscillation in the converter circuit 100. The feedback control circuit 110 generates the input pulses based in part on the provided compensation signal. The slope compensation with slope adjustment circuit 112 is also configured to dynamically adjust (e.g., modulate) the compensation signal based on the inductor circuit 102. By dynamically adjusting the compensation signal, the power stage circuit 104 can operate at a higher bandwidth. The converter circuit further reduces instabilities that may otherwise arise due to selection of inductor circuit 102. Thus, the converter circuit 100 is configured to be flexible for us in a variety of applications with different inductors 102 without requiring redesign of internal components of the converter circuit 100.

Figure 2:
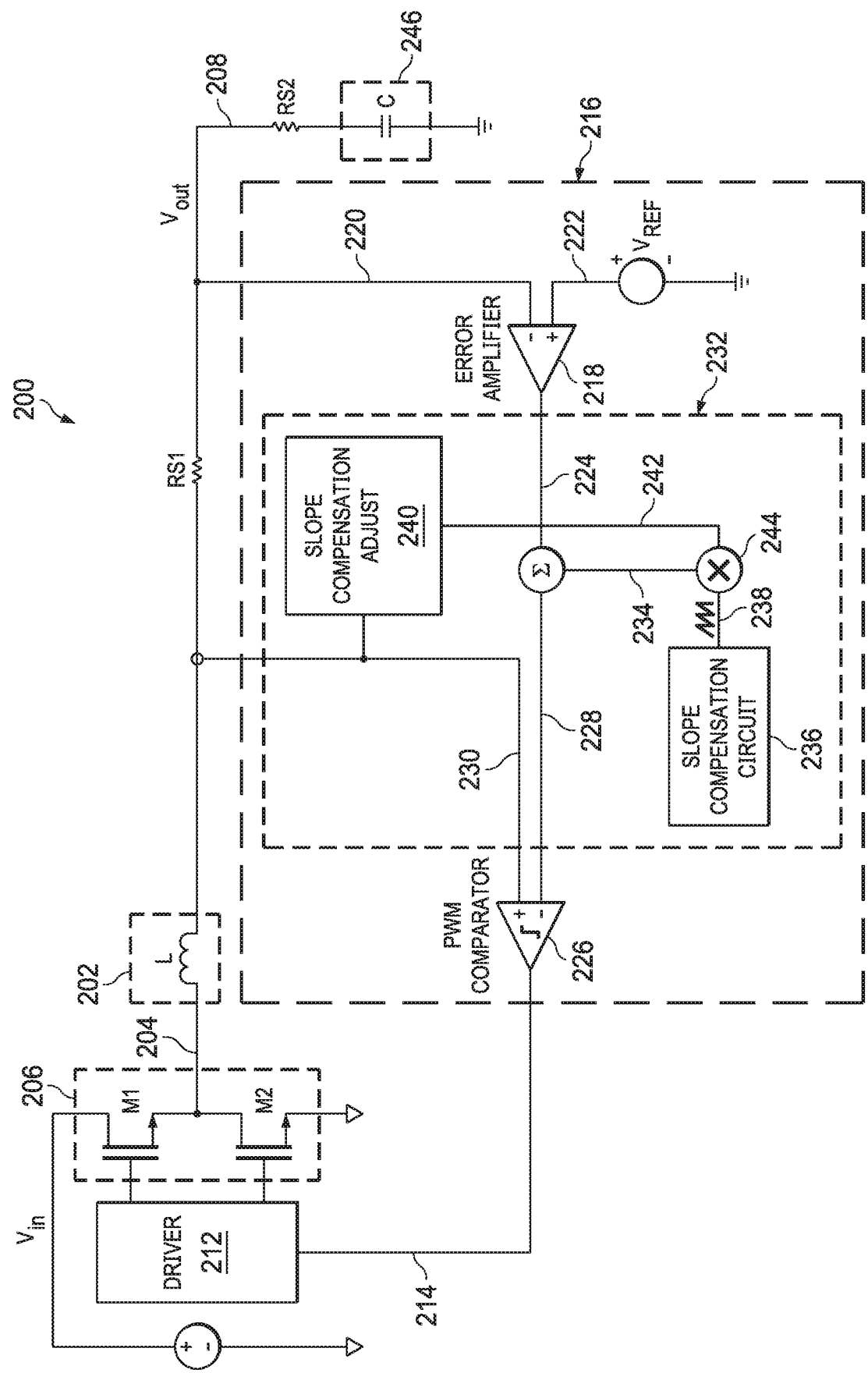
FIG. 2 illustrates an example circuit diagram of a power converter circuit with adaptive slope compensation.

FIG. 2 illustrates an example circuit diagram of a converter circuit 200 (e.g., corresponding to the converter circuit 100 of FIG. 1). An inductor circuit 202 includes an inductor L that is coupled to receive an input voltage $V_{in}$ at a corresponding inductor circuit input 204. A power stage circuit 206 converts the input voltage $V_{in}$ to provide a corresponding output voltage $V_{out}$ at a power stage output 208 to which a load 246, such as capacitor C, may be connected. For example, the power stage circuit 206 may be configured as a DC-DC converter to buck or boost the input voltage $V_{in}$ to the output voltage $V_{out}$. In other examples, the converter circuit 100 may be a buck-boost converter, a single-ended primary-inductor converter (SEPIC) or other DC-DC converter as well as include more than one power stage circuit (not shown). The power stage circuit 206 includes one or more switch devices (e.g., demonstrated as field effect transistor devices M1 and M2). The power stage circuit 206 is configured to activate and deactivate M1 and M2 based on drive signals from a driver circuit 212. The driver circuit 212 (e.g. a gate driver) is connected to drive the M1 and M2 of the power stage circuit 206 in response to a control signal (e.g., PWM signal or PFM signal) 214 generated by a feedback control circuit 216. The feedback control circuit 216 is configured to generate the feedback signal based on the output voltage $V_{out}$.

As an example, the feedback control circuit 216 includes an error amplifier 218 which compares a feedback voltage at a first error amplifier input 220 with a reference voltage $V_{REF}$ received at another error amplifier input 222 to produce an error amplifier output voltage at an error amplifier output 224. For example, the feedback voltage corresponds to the output voltage $V_{out}$ and is regulated to VREF. RS1 is the DC resistance ("DCR") of the inductor L and RS2 is the equivalent-series resistance ("ESR") of the output capacitor C.

A comparator circuit 226 compares a voltage representing a command current provided at inverting input 228 with a voltage representing a sensed current signal at the inductor circuit 202, which is provided to a non-inverting input 230. The current comparator circuit 226 provides a pulsed signal (e.g., a PWM output) based on the sensed current signal relative to the command current at a current comparator output. In one example, the current signal provided to the non-inverting input 230 may be emulated, rather than sensed, depending on a control topology.

The command voltage provided at the inverting input 228 is generated based on the output of the error amplifier 218 at the error amplifier output 224 and compensation provided at adjusted slope compensation output 234 by a slope compensation with slope adjustment circuit 232. In one example, the current command provided at 228 is a summation of the output of the error amplifier 218 and a slope compensation signal and slope compensation adjustment signal. The slope compensation with slope adjustment circuit 232 includes a slope compensation circuit 236 and a slope compensation adjustment circuit 240. The slope compensation circuit 236 is configured to produce a slope compensation signal at slope compensation output 238. For example, the produced slope compensation can either be fixed or it can be generated based on the input voltage Vin and/or the output voltage $V_{out}$.

The slope compensation adjustment circuit 240 is configured to produce a slope compensation adjustment at a slope compensation adjustment output 242 that varies based on the current through the inductor circuit 202. For example, a current sensor is configured to sense current the current through the inductor circuit 202 and provide a signal indicative thereof. The current sensor signal is also provided to the input 230 of comparator 226. The slope compensation adjustment at 242 is utilized to dynamically adjust the slope compensation at 238 based on the inductor current. As an example, the slope compensation with slope adjustment circuit 232 further includes a modulation circuit 244 configured to modulate the slope compensation signal provided at the slope compensation output 238 with the slope compensation adjustment at slope compensation adjustment output 242 to produce the adjusted slope compensation command signal at adjusted slope compensation output 234. By sensing a slope of inductor current at inductor circuit 202, the slope compensation with slope adjustment circuit 232 can modulate slope compensation to accommodate variations in the inductor value L, which can vary as a customer changes values of the inductor L, without requiring redesign of the converter circuit 200.

In some examples, the converter circuit 200 can be implemented as an IC semiconductor chip device that interfaces with external components (e.g., including the input supply VIN, inductor circuit 202 and load at 208). It should be further appreciated that the converter circuit 200 may be implemented with a subset of the components described herein. For example, the converter circuit 200 may exclude the inductor circuit 202.

Figure 3:
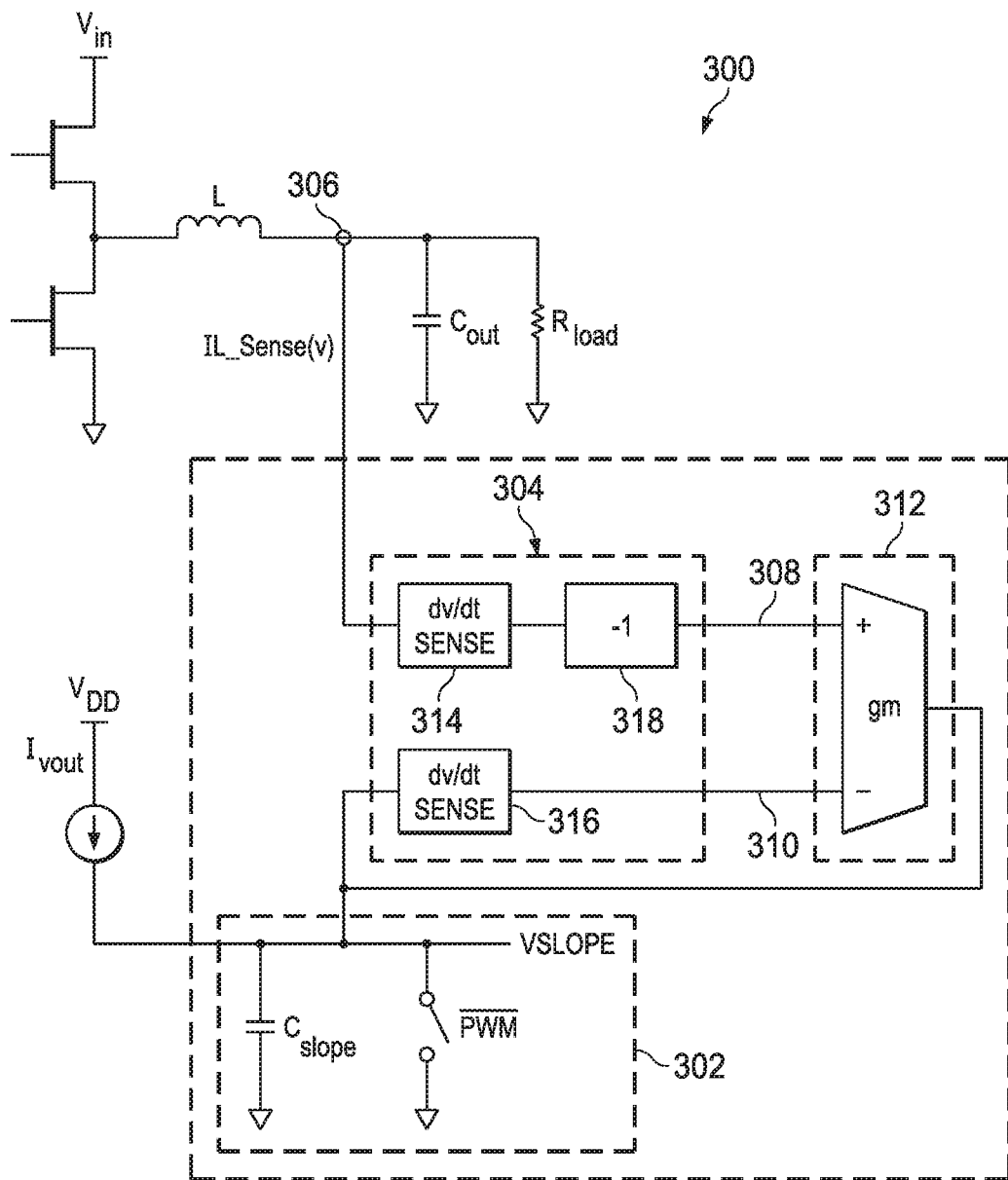
FIG. 3 illustrates an example circuit diagram of for a portion of the circuit of FIG. 2.

FIG. 3 illustrates an example slope compensation with slope adjustment circuit 300 (e.g., the slope compensation with slope adjustment circuit 112 of FIG. 1 and the slope compensation with slope adjustment circuit 232 of FIG. 2). The slope compensation with slope adjustment circuit 300 includes a slope compensation circuit 302 (e.g., the slope compensation circuit 236 of FIG. 2) configured to produce a slope compensation signal VSLOPE based on current $I_{vout}$ at output voltage $V_{DD}$. In particular, the slope compensation circuit 302 integrates the output voltage current $I_{vout}$ over a slope capacitor $C_{slope}$ when a PWM signal is high to generate the slope compensation signal VSLOPE.

The slope compensation with slope adjustment circuit 300 further includes a slope adjustment circuit 304 (e.g., the slope compensation adjustment circuit 240 of FIG. 2) configured to receive a signal represented the sensed output current $I_L$. For example, a current sensor, schematically demonstrated at 306, is coupled to sense the current at an output of inductor L, such as at a node connected to an output capacitor $C_{out}$ in parallel with a load, demonstrated as resistance $R_{load}$. The slope adjustment circuit 304 is further configured to generate an emulated upslope current at a first output 308 based on the sensed inductor current $I_L$ provided to the output capacitor $C_{out}$ and load Sense at the inductor L.

The slope adjustment circuit 304 is further configured to provide a sensed downslope current at a second output 310 based on the output voltage $V_{DD}$. In particular, the slope adjustment circuit 304 includes a first derivative circuit 314 coupled to a negative one (−1) gain circuit 318 configured to assert the emulated upslope when a slope of the sensed current is positive and a second derivative circuit 316 configured to assert the sensed downslope when the slope of the sensed current is negative. Thus, the slope adjustment circuit 304 asserts its respective outputs 308 and 310 depending on whether the inductor current is increasing (upslope) or decreasing (downslope).

The slope adjustment circuit 304 is coupled to drive a modulation circuit 312 according to the upslope and downslope signals provided at 308 and 310, respectively. The modulation circuit 312 (e.g., the modulation circuit 244 of FIG. 2) includes a transconductance amplifier gm. The transconductance amplifier gm is configured to modulate emulated upslope at the first output 308 with the sensed downslope at the second output 310 to produce an adjusted slope compensation signal VSLOPE such that sensed downslope and the emulated upslope are equal.

Figure 4:
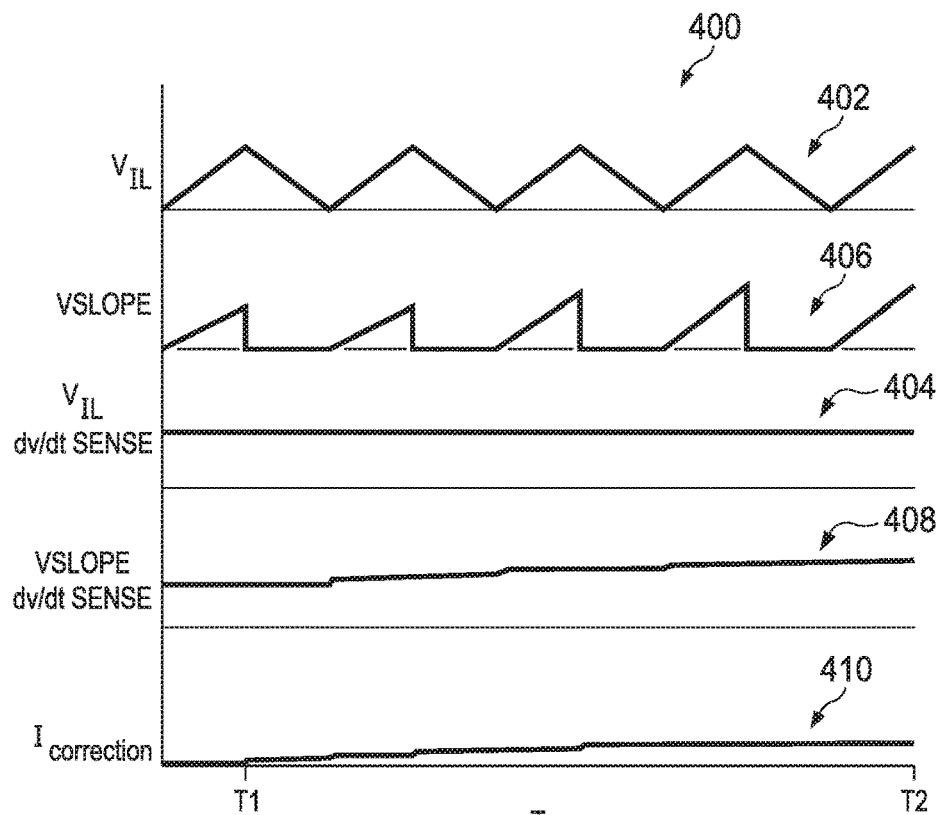
FIG. 4 illustrates an example timing diagram for signals in the slope compensation with slope adjustment circuit of FIG. 3.

An example of the function of the slope compensation with slope adjustment circuit 300 will be further appreciated with reference to a timing diagram 400 illustrated in FIG. 4. The timing diagrams include a waveform 402 representative of a voltage $V_{IL}$ sensed at the inductor L (e.g. IL_Sense(v) of FIG. 3), illustrated as ramping up and down over time T. The timing diagram further includes a waveform 404 representative of a constant slope of voltage $V_{IL}$ sensed at the inductor that does not change over time T. A slope compensation signal VSLOPE, as represented by waveform 406, starts out a level less than the voltage $V_{IL}$, at a first time T1. As a correction current $I_{correction}$ (e.g. a current introduced by the slope adjustment circuit 304 of FIG. 3) is added and increased over time T, as illustrated by waveform 410, a slope of the slope compensation signal VSLOPE begins to increase over time until it matches the voltage $V_{IL}$ slope at time T2, as illustrated by waveform 408. Thus, the slope compensation signal VSLOPE reaches a level equal to the level of the voltage $V_{IL}$ at the second time T2.

Figure 5:
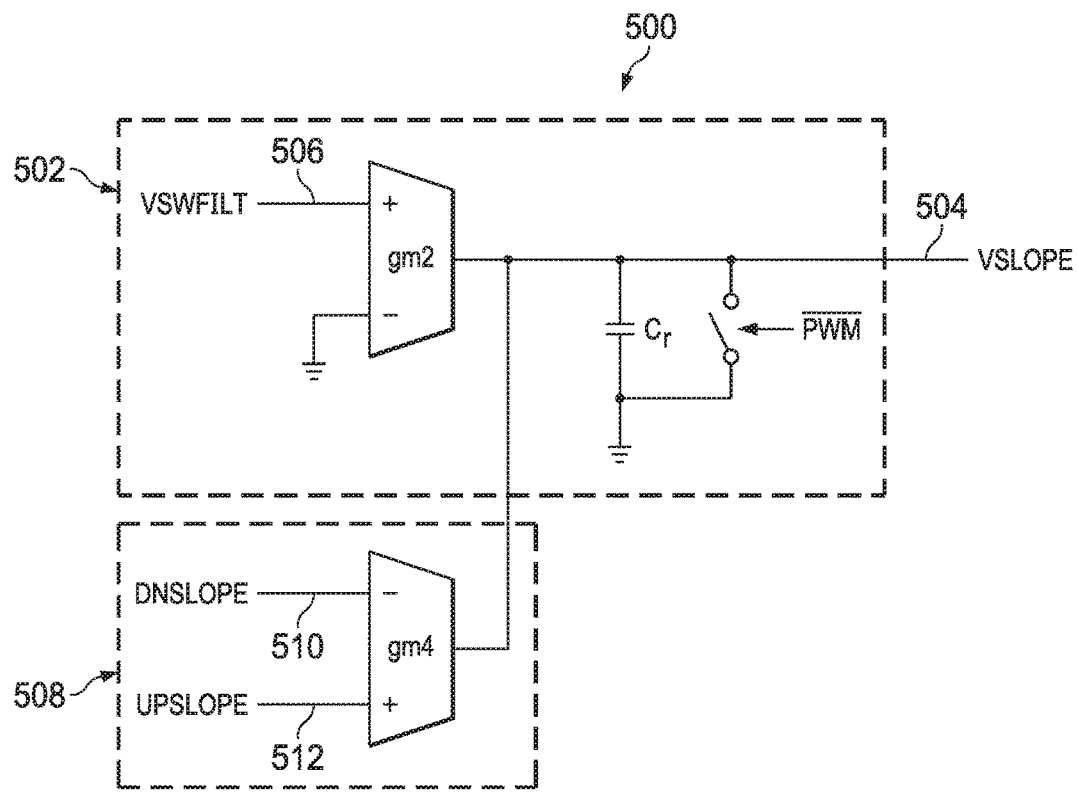
FIG. 5 illustrates another example circuit diagram of a slope compensation with slope adjustment circuit for the circuit of FIG. 2.
Figure 6:
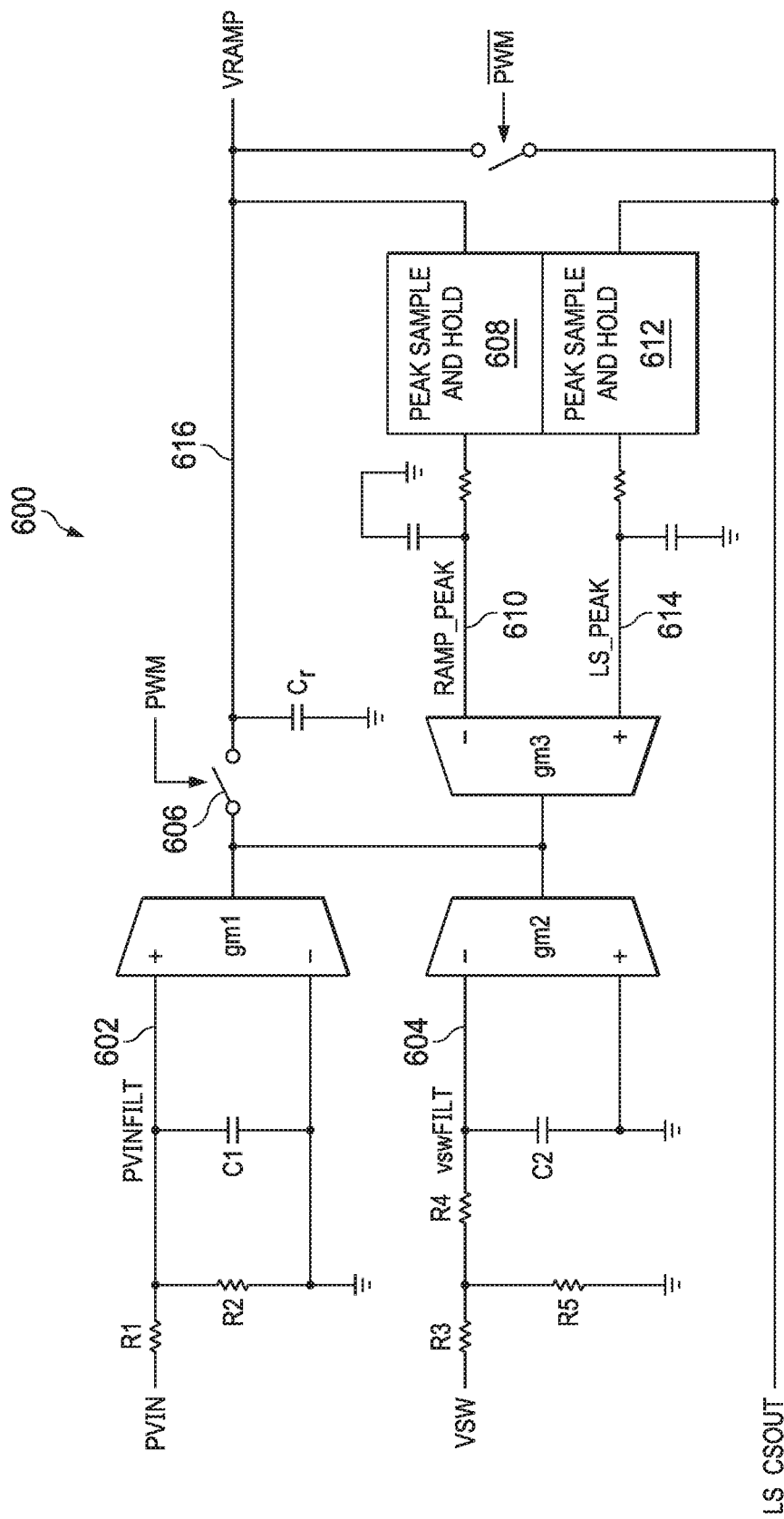
FIG. 6 illustrates an example circuit diagram of a replicated inductor current generation circuit for generating an emulated upslope current with a sensed down-slope current that can be implemented in the circuit of FIG. 5.
Figure 7:
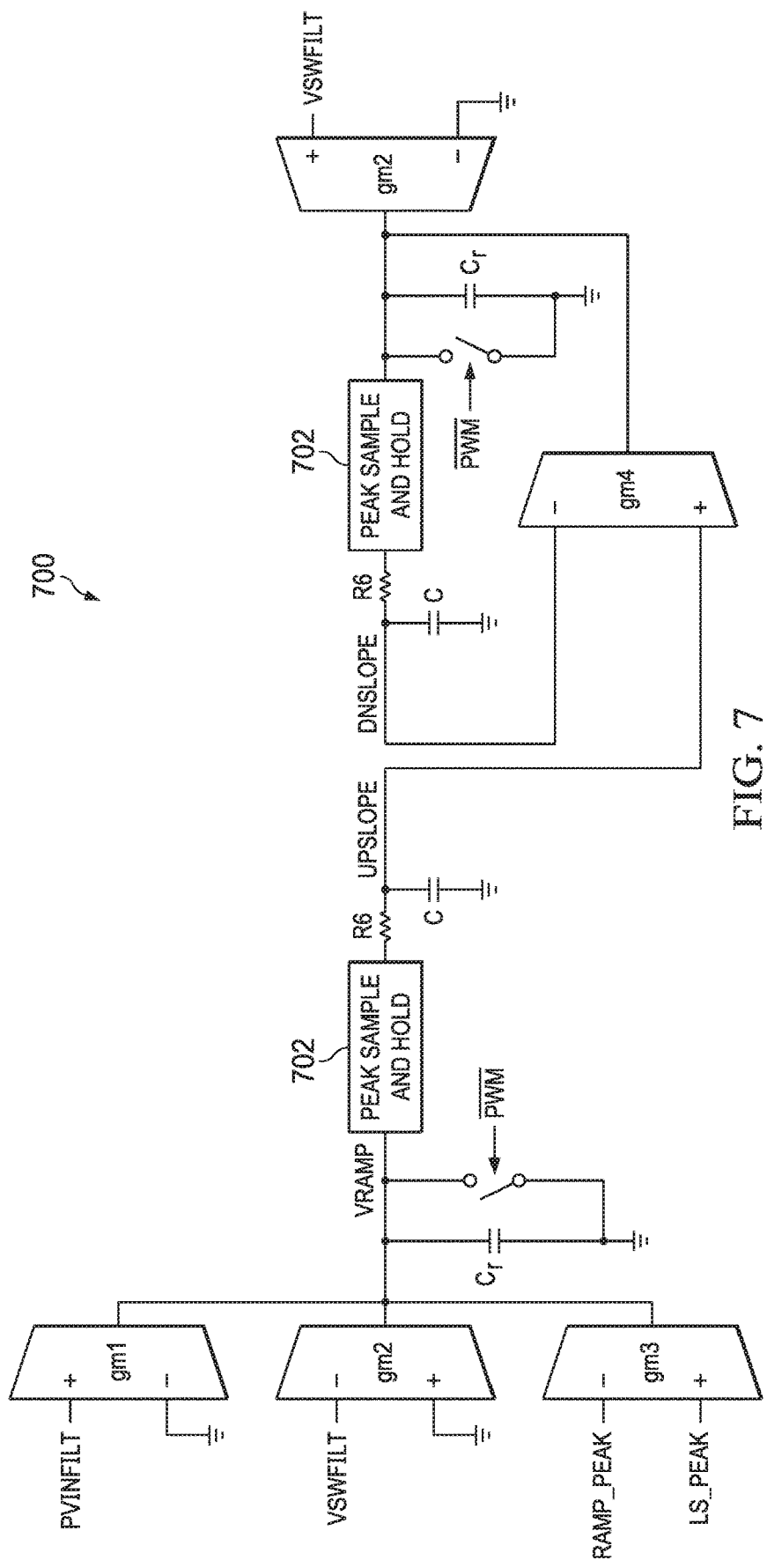
FIG. 7 illustrates an example circuit diagram of a dynamic adjustment circuit that incorporates the circuit for generating an emulated upslope current of FIG. 6 and implements the circuit of FIG. 5.

A slope compensation with slope adjustment circuit (e.g., the slope compensation with slope adjustment circuit 112 of FIG. 1, the slope compensation with slope adjustment circuit 232 of FIG. 2, and the slope compensation with slope adjustment circuit 300 of FIG. 3) will be further appreciated with reference to an example implementation in a buck converter, as illustrated in FIGS. 5-7. In this specific application, inductor current is sensed on the down-slope and emulated on the upslope.

FIG. 5 illustrates an example implementation of a slope compensation with slope adjustment circuit 500 (e.g., the slope compensation with slope adjustment circuit 112 of FIG. 1 and the slope compensation with slope adjustment circuit 232 of FIG. 2), such as may be implemented in a buck converter. The circuit 500 includes a slope compensation circuit 502 (e.g., the slope compensation circuit 236 of FIG. 2 and the slope compensation circuit 302 of FIG. 3) configured to generate a slope compensation signal VSLOPE at output 504. The circuit 500 includes a transconductance amplifier gm2 configured to generate the slope compensation signal VSLOPE by integrating a filtered version of a switched input voltage VSWFILT at input 506 over a capacitor $C_r$ when a Pulse Width Modulation ("PWM") signal is a logic high. A slope compensation adjustment circuit 508 (e.g., the slope compensation adjustment circuit 240 of FIG. 2 and the slope compensation adjustment circuit 304 of FIG. 3) is configured to receive an emulated upslope current UPSLOPE signal at a first input 512 of a transconductance amplifier gm4. The emulated upslope current UPSLOPE signal is based on an inductor current. The slope compensation adjustment circuit 508 is further configured to receive a sensed downslope current DNSLOPE signal at second input 510 of the transconductance amplifier gm4. The transconductance amplifier gm4 is configured to modulate the emulated upslope UPSLOPE with the sensed downslope DNSLOPE to adjust the slope compensation signal VSLOPE generated by the slope compensation circuit 502 such that sensed downslope and the emulated upslope are equal. Thus, the adjusted slope compensation signal VSLOPE will have a slope proportional to the down-slope of the inductor current.

FIG. 6 illustrates an example replicated inductor current generation circuit 600 (hereinafter "circuit 600") for generating an emulated upslope current with a sensed down-slope current that can be implemented in an example slope compensation with slope adjustment circuit (e.g., the slope compensation with slope adjustment circuit 500 of FIG. 5). In particular, the circuit 600 includes three transconductance amplifiers gm1, gm2, and gm3 configured to generate an emulated upslope current.

The first transconductance amplifier gm1 is coupled to an input voltage PVIN at a non-inverting input 602. In one example, the input voltage PVIN is filtered or divided down by an RC filter, which includes resistors R1 and R2 and a capacitor C1, to produce a filtered input voltage PVINFILT. The first transconductance amplifier gm1 provides a corresponding output current based on the filtered input voltage PVINFILT. The second transconductance amplifier gm2 is coupled to an output of a half-bridge SW node of a buck converter VSW at a non-inverting input 604. In one example, the output of a half-bridge SW node of a buck converter VSW is filtered by RC filter, including resistors R3, R4, R5 and capacitor C2, to produce a filtered output of the half-bridge SW node of a buck converter, demonstrated VSWFILT. The second transconductance amplifier gm2 produces an output current based on the VSWFILT. The output current of the first are aggregated to drive a switch 606. In one example, the first transconductance amplifier gm1 is equal to the second transconductance amplifier gm2.

The switch 606 is controlled in response to a pulse width modulation ("PWM") signal. When the PWM signal is a logic high, a capacitor $C_r$ is charged with a current that is based on the sum of currents produced by gm1, gm2 and gm3 (e.g., from a feedback circuit). The aggregate current is proportional to the difference between VSW (or $V_{out}$) and PVIN and the voltage across the capacitor $C_r$ produces a ramp voltage VRAMP at 616. When the PWM signal is a logic low, VRAMP is coupled to a current sense amplifier output voltage LS_CSOUT. Thus, VRMAP is a reconstructed signal representative of the inductor current based on a sensed down-slope an emulated upslope.

As a further example, the feedback circuit is configured to sample peak of the emulated upslope at 608 and filtered (e.g., by an RC filter) to provide a filtered sample-and-hold of the peak VRAMP voltage RAMP_PEAK. The voltage RAMP_PEAK is provided to the third transconductance amplifier gm3 at an inverting input 610. A peak of the current sense amplifier output voltage LS_CSOUT is sampled (by sample and hold circuit) at 612 and filter to provide a filtered peak LS_PEAK voltage. The LS_PEAK voltage is provided to the third transconductance amplifier gm3 at a non-inverting input 614. The third transconductance amplifier gm3 modulates RAMP_PEAK and LS_PEAK in generate a corresponding output current of the emulated upslope so that the peak of the upslope and LS_CSOUT are equal. In one example, the third transconductance amplifier gm3 is greater than the first and second transconductance amplifiers gm1 and gm2.

FIG. 7 illustrates an example dynamic adjustment circuit 700 (hereinafter "circuit 700") that includes a circuit for generating an emulated upslope current (e.g., corresponding to the example circuit 600 of FIG. 6) and implements an example slope compensation with slope adjustment circuit (e.g., the slope compensation with slope adjustment circuit 500 of FIG. 5). The circuit 700 is configured to dynamically adjusts slope compensation. The circuit 700 includes a first transconductance amplifier gm1, a second transconductance amplifier gm2, and a third transconductance amplifier gm3 that are in combination configured to generate an emulated upslope current, as described in FIG. 6. The transconductance amplifiers provide current to a capacitor $C_r$ that is charged based on the aggregate current from the transconductance amplifiers gm1, gm2 and gm3 according to the inverted PWM signal to generate a corresponding ramp voltage VRAMP. The circuit 700 includes a sampling circuit 702 configured to sample and hold a peak current of the VRAMP. The circuit 700 further includes a resistor R6 and capacitor C configured to filter the sample and hold a peak current of the reconstructed inductor current VRAMP and to generate an UPSLOPE signal. The UPSLOPE signal is supplied to a non-inverting input of another transconductance amplifier gm4.

The circuit 700 also includes another transconductance amplifier gm2 that is configured to provide current to the capacitor Cr based on the filtered output SW node voltage VSWFILT. The capacitor is switched between charge and discharge states based on the PWM signal to generate a downslope current, which is sampled and held by the sampling circuit 702. The peak sampled signal is filtered by the resistor R6 and capacitor C to generate a DNSLOPE signal (e.g., a voltage signal) that is supplied to an inverting input of the transconductance amplifier gm4. Thus, the circuit 700 performs two functions based on the PWM signal. In particular, when the PWM signal is a logic high, the circuit 700 generates the UPSLOPE signal and when the PWM signal is a logic low the circuit 700 generates the DNSLOPE signal. The resulting combination of UPSLOPE and DNSLOPE signals are provided as a differential input to the transconductance amplifier gm4. The transconductance amplifier gm4 generates a current that is fed back to the output of the gm2 of downslope generator circuit based on the voltage difference between the UPSLOPE and DNSLOPE signals to adjust the DNSLOPE signal to be equal to the UPSLOPE signal.

For example, if the DNSLOPE signal is less than the UPSLOPE signal, the fourth transconductance amplifier gm4 is configured to remove current. If the DNSLOPE signal is greater than the UPSLOPE signal, the fourth transconductance amplifier gm4 is configured to add current. This causes the slope of the DNSLOPE ramp to be proportional to the down-slope of the inductor current.

It should be appreciated that although capacitor $C_r$, sampling circuit 702, resistor R6, and third transconductance amplifier gm3 are illustrated twice, the circuit 700 includes a single instance of the respective components. However, the respective components are illustrated twice to aid in understanding of the circuit 700 and to show the two different functions performed by the circuit 700 based on the PWM signal.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A converter circuit, comprising:
a power stage circuit configured to convert an input voltage received by an inductor to an output voltage provided at an output;
a control circuit configured to generate input pulses to control the power stage circuit;
a slope compensation circuit configured to generate a compensation signal;
a slope compensation adjustment circuit configured to determine a rate of change of output current at the inductor and to provide a slope compensation adjustment signal based on the determined rate of change; and
a modulation circuit configured to modulate the compensation signal with the slope compensation adjustment signal to produce an adjusted slope compensation signal, the input pulses based at least in part on the adjusted slope compensation signal and the output current.

2. The converter circuit of claim 1, wherein the slope compensation adjustment circuit is further configured to sense the output current at the inductor, to determine a downslope of the sensed output current, and to generate an emulated upslope based on the sensed output current.

3. The converter circuit of claim 2, wherein the modulation circuit is further configured to modulate the emulated upslope with the downslope to produce the adjusted slope compensation signal such that the downslope equals the emulated upslope.

4. The converter circuit of claim 2, wherein the slope compensation adjustment circuit is configured to generate the emulated upslope by integrating over a capacitor a current proportional to a difference between a voltage measured at an input to the converter circuit and a voltage measured at an output of the converter circuit.

5. The converter circuit of claim 4, wherein the converter circuit comprises a buck converter, and
wherein the voltage measured at the output of the converter circuit comprises a voltage measured at an output of a half-bridge node of the buck converter.

6. The converter circuit of claim 4, wherein the slope compensation adjustment circuit is further configured to sample a peak of the emulated upslope, to sample a peak of the downslope, and wherein the modulation circuit is configured to adjust a charging current of the emulated upslope so that the peak of the emulated upslope is equal to the peak of the downslope.

7. The converter circuit of claim 6, wherein the modulation circuit is configured to add current to the compensation signal if the emulated upslope is less than the downslope, and wherein the modulation circuit is configured to remove current from the compensation signal if the emulated upslope is greater than the downslope.

8. The converter circuit of claim 2, wherein the modulation circuit comprises a transconductance amplifier configured to modulate the emulated upslope with the downslope.

9. A converter circuit, comprising:
a power stage circuit coupled between an input and an output of the converter circuit, the power stage circuit including a control input;
a driver circuit coupled to the control input;
a feedback circuit comprising:
an error amplifier coupled to a feedback voltage and a reference voltage;
a comparator coupled to the driver circuit including a first input coupled to an output of the error amplifier and a second input coupled to an output of the power stage; and
a slope compensation with slope adjustment circuit coupled to the output of the error amplifier and to the first input of the comparator, the slope compensation with slope adjustment circuit including a first transconductance amplifier coupled to an input voltage and configured to modulate the input voltage.

10. The converter circuit of claim 9, wherein the slope compensation with slope adjustment circuit is configured to provide a dynamically adjusted compensation signal based on a value of a selected inductor coupled to the output of the power stage circuit.

11. The converter circuit of claim 9 wherein the slope compensation with slope adjustment circuit comprises:
a second transconductance amplifier coupled to an output voltage and configured to modulate the output voltage; and
an integrating capacitor coupled to the first transconductance amplifier and the second transconductance amplifier and configured to integrate the input voltage and the output voltage to produce an emulated upslope for current through the inductor.

12. The converter circuit of claim 11, further comprising:
a first sampling circuit coupled to the integrating capacitor and configured to sample a peak of the emulated upslope;
a second sampling circuit coupled to the output of the inductor and configured to sample a peak of a sensed downslope current; and
a third transconductance amplifier coupled to the first sampling circuit and the second sampling circuit and configured to modulate the peak of the emulated upslope with the peak of the sensed downslope current and to adjust a charging current of the emulated upslope such that the emulated upslope equals the sensed downslope current.

13. The converter circuit of claim 12, wherein the slope compensation with slope adjustment circuit comprises a fourth transconductance amplifier configured to modulate an emulated upslope current of the inductor with a sensed downslope current of the inductor to provide a dynamically adjusted compensation signal such that the emulated upslope current is equal to the sensed downslope current.

14. An integrated circuit device, comprising:
a control circuit configured to generate a control signal to control a power converter circuit;
a slope compensation circuit configured to provide a compensation signal to the control circuit, wherein the control circuit is configured to generate the control signal based at least in part on the compensation signal;

a slope compensation adjustment circuit configured to dynamically adjust the compensation signal based on a rate of change of a sensed output current of an inductor selected to be coupled to the power converter circuit; and wherein the slope compensation adjustment circuit is configured to determine a downslope of the sensed output current, generate an emulated upslope based on the sensed output current, and modulate the emulated upslope with the downslope to produce the adjusted slope compensation signal such that the downslope approximates the emulated upslope.

15. The integrated circuit device of claim 14, wherein the slope compensation adjustment circuit is configured to receive a current signal or a voltage signal at the inductor for sensing the rate of change of the sensed output current.

16. The integrated circuit device of claim 14, wherein the slope compensation adjustment circuit comprises a transconductance amplifier configured to modulate the emulated upslope with the downslope.

17. The integrated circuit device of claim 14, wherein the slope compensation adjustment circuit is configured to generate the emulated upslope by integrating over a capacitor a current proportional to a difference between a voltage measured at an input to the integrated circuit and a voltage measured at an output of the integrated circuit.

18. The integrated circuit device of claim 17, wherein the slope compensation adjustment circuit is further configured to sample a peak of the emulated upslope, to sample a peak of a downslope current through the inductor, and to adjust a charging current of the emulated upslope so that the peak of the emulated upslope is equal to the peak of the downslope current.

19. The integrated circuit device of claim 18, wherein the slope compensation adjustment circuit is configured to add current to the compensation signal if the emulated upslope is less than the downslope current, and wherein the slope compensation adjustment circuit is configured to remove current from the compensation signal if the emulated upslope is greater than the downslope current.

\* \* \* \* \*